United States Patent [19]
Juang

[11] Patent Number: 5,148,736
[45] Date of Patent: Sep. 22, 1992

[54] AUTOMATIC SOLAR-POWERED CAR VENTILATOR

[76] Inventor: William Juang, 13, Hsi-Li Lane, Wai-Chu Village Erh-Lin Town, Chang-Hua Hsien, Taiwan

[21] Appl. No.: 640,643

[22] Filed: Jan. 14, 1991

Related U.S. Application Data

[63] Continuation-in-part of Ser. No. 533,168, Jun. 4, 1990, abandoned.

[51] Int. Cl.⁵ .............................................. B60H 1/26
[52] U.S. Cl. .................................. 454/131; 454/142; 454/900
[58] Field of Search ........................ 98/2.02, 2.13, 900

[56]   References Cited
   U.S. PATENT DOCUMENTS 4,899,645  2/1990  Wolfe ................................ 98/2.13 X
4,986,169  1/1991  Chen ................................. 98/2.13 X

FOREIGN PATENT DOCUMENTS 280337  12/1986  Japan .................................... 98/900
2197944  6/1988  United Kingdom ................. 98/2.02

*Primary Examiner*—Harold Joyce

[57]   ABSTRACT

An automatic solar-powered car ventilator to be installed between the upper horizontal bar of the window sash and the upper horizontal edge of a movable window glass in a window in a car door having a main body and two auxiliary bodies extending from both sides of the main body to be cut to suit the width of the movable window glass. A ventilating means including a fan, a motor to drive the fan to suck in the open air and exhaust out the air in the car. A base to mount the fan and the motor and a housing to shield the fan, the motor and the base. A solar-energy board being combined with the main body or the ventilating means by means of two clamps on the board movably catching hold of either two holders on the main body or on the ventilating means to generate electricity to power the motor by absorbing the sunlight.

3 Claims, 6 Drawing Sheets

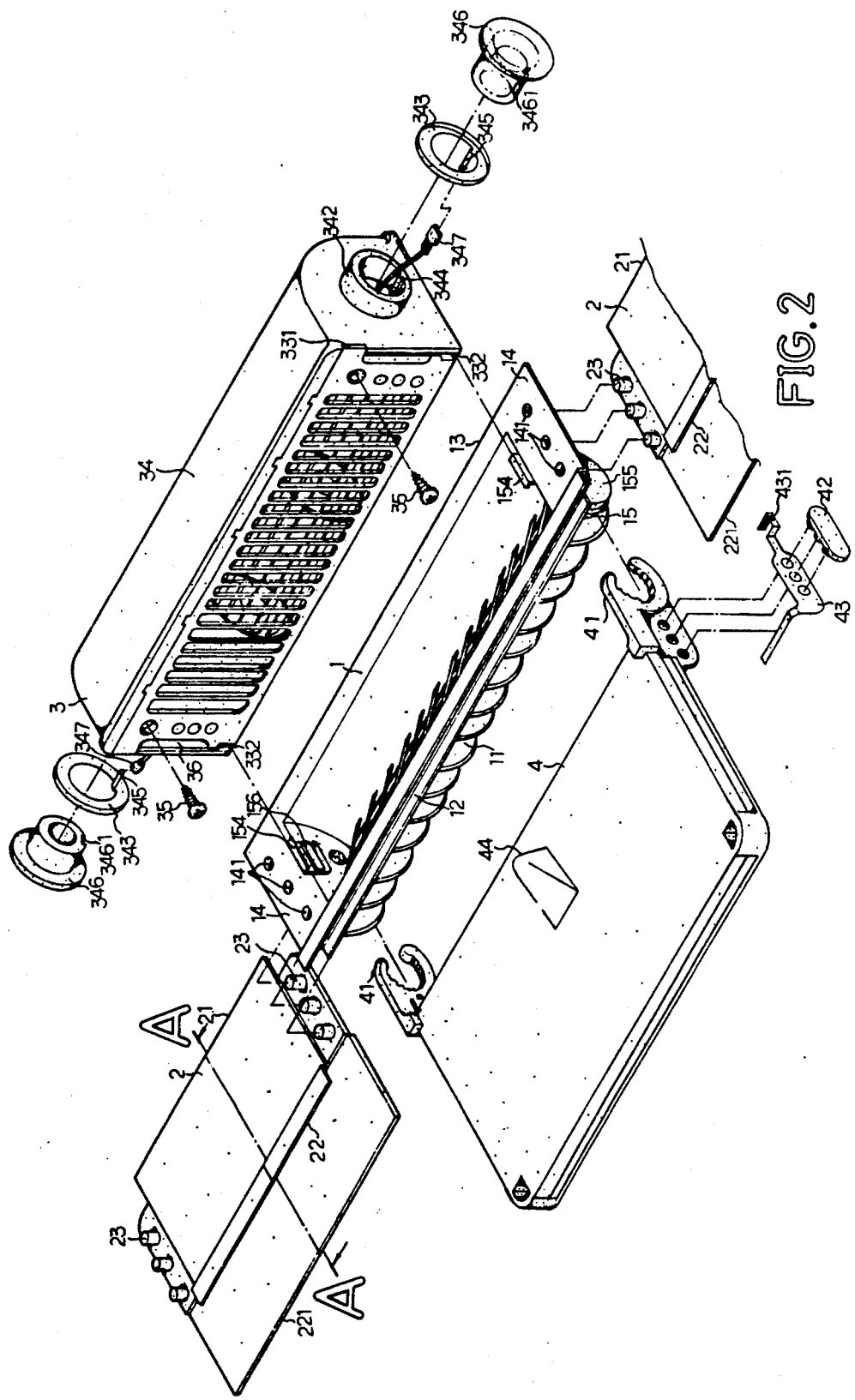

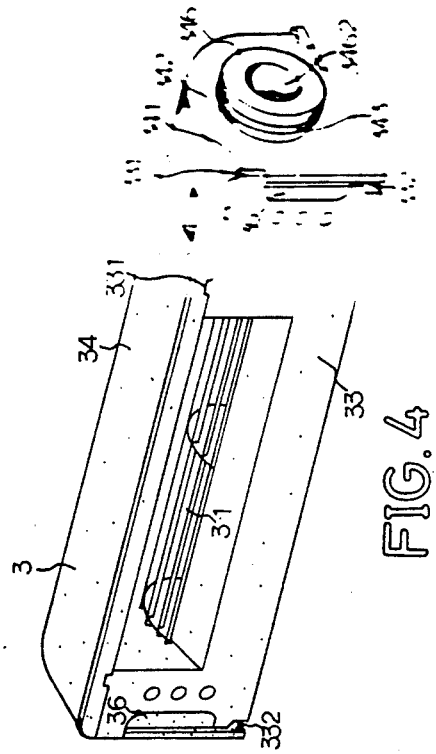
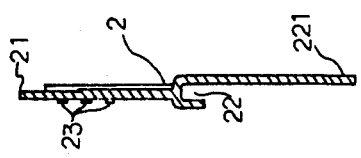
FIG. 2(A-A)
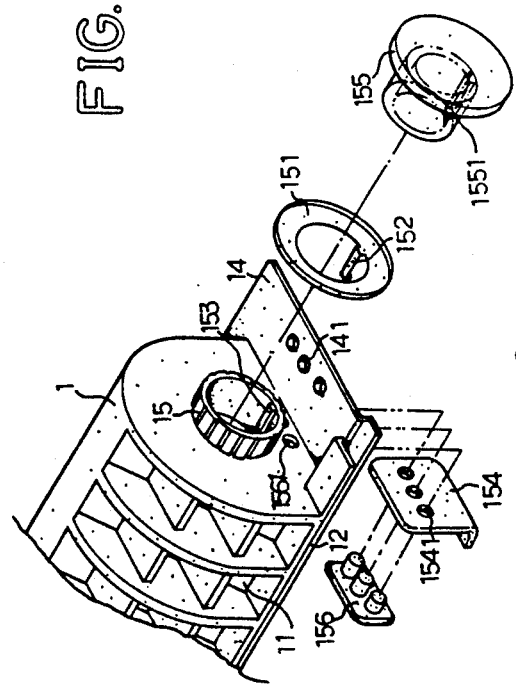

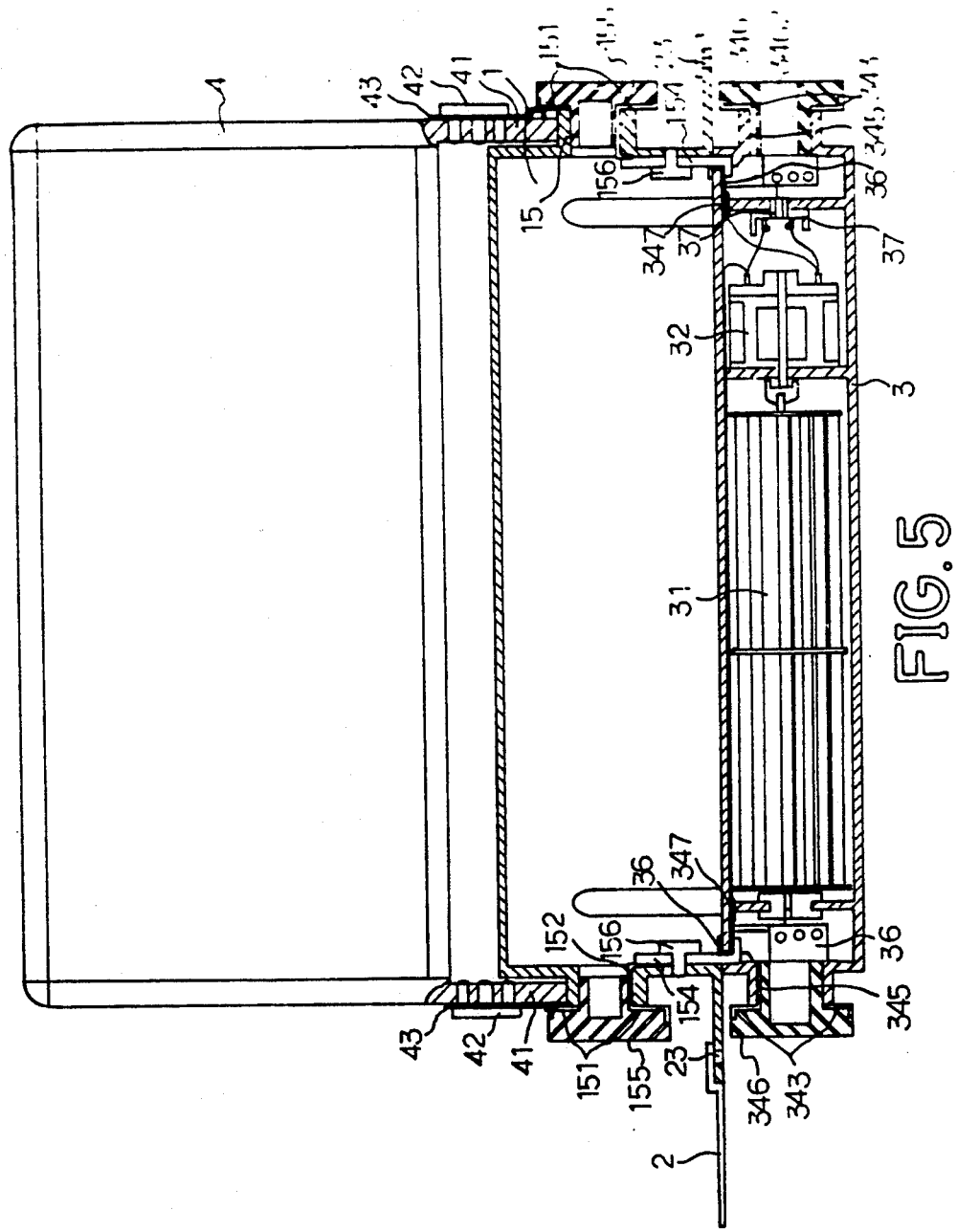

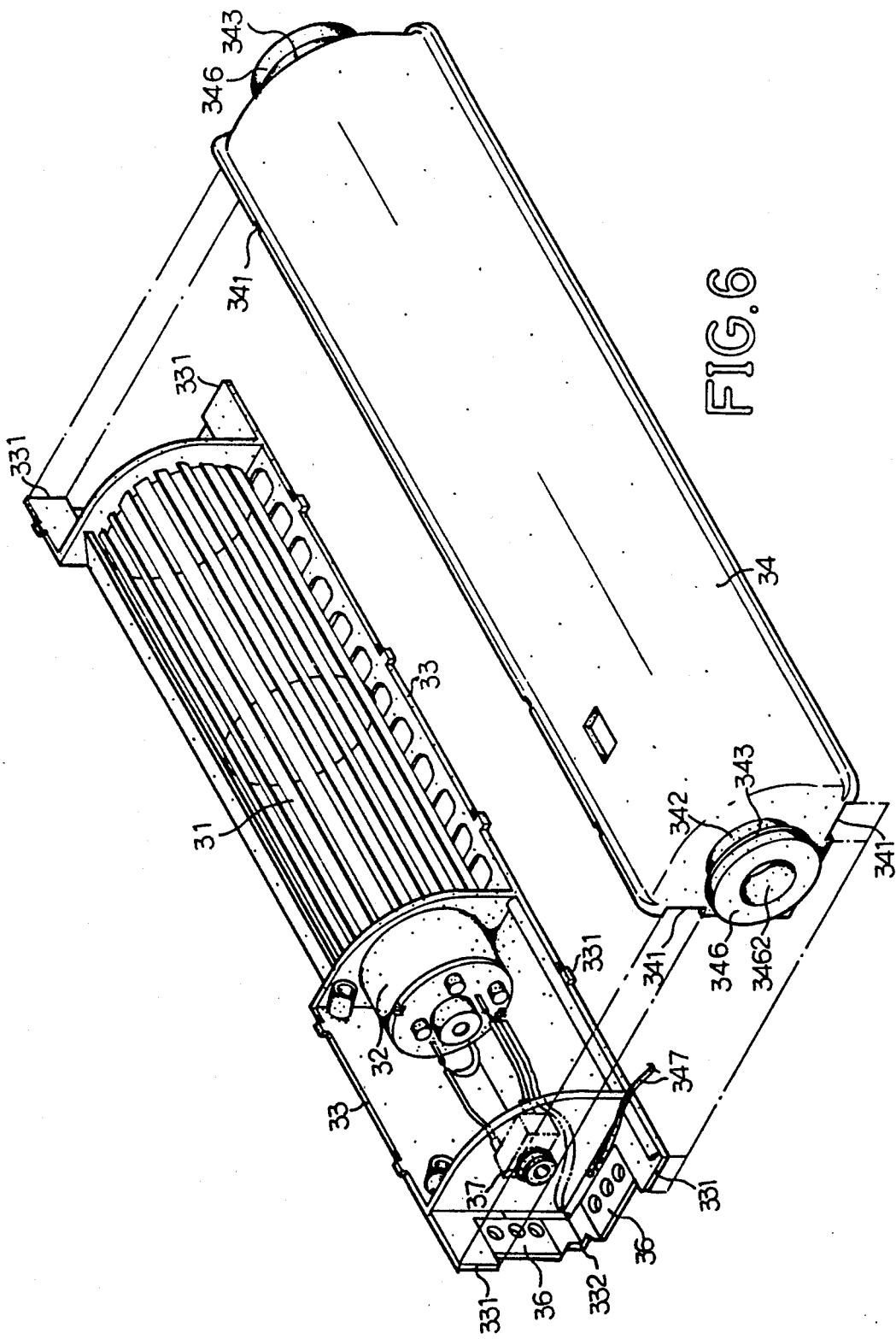

AUTOMATIC SOLAR-POWERED CAR VENTILATOR

This is a continuation-in-part of application Ser. No. 533,168 filed June 4, 1990, abandoned.

BACKGROUND OF THE INVENTION

This invention concerns improving a Taiwan patent application of Ser. No. 79,204,484 having the title "Solar-energy ventilator for cars", which has been found to have the following disadvantages.

The air sucking-in groove is positioned below the motor, and the cool air supplied by the air sucking-in groove can be exhausted out by the fan before it can mix with the stale air in the car. Therefore, there occurs an air convection in a small area in the car to hamper the stale air in the car from being effectively exhausted out of the car.

Another disadvantage is that the solar-energy board is positioned in some place in the car, maybe limited to the flat surface in the front or in the rear. Then, if the front wind shield or the rear wind shield should use a heat-insulating glass or be stuck on with a heat-insulating paper, sunlight can not be strong enough to allow the solar-energy board to function well.

SUMMARY OF THE INVENTION

In view of the above-mentioned, this invention has been devised so as to use preferably two of them, one for sucking in the open air and the other for exhausting out the stale air in a car, to achieve good ventilation.

In this invention, the solar energy board is designed to be provided with two clamps to assemble with a main body or a ventilating means so that the board can be readily adjusted in its inclination to suit the direction of sunlight to get the most heat. But the board can also be positioned in a proper place in the car instead, as the above-mentioned case.

The automatic solar-powered car ventilator in the present invention comprises a main body, two auxiliary bodies, a ventilating means and a solar-energy board as the main components.

The main body has a rectangular plate, two wings extending outward from the rectangular plate, an lengthwise air outlet at the rear, a glass groove at the bottom edge for the upper edge of a movable window glass in a window of a car door to fit in, a cylindrical holder respectively at both side vertical walls for a clamp of the solar-energy board to catch hold of to assemble the solar-energy board with the main body, a conducting ring fitting around the holder, a cap to insert in the interior hollow of the holder to keep the conducting ring in its position, and an L-shaped conductor fixed on each of both side walls below the holder and being in contact with the conducting ring.

The two auxiliary bodies are to be connected with both lengthwise sides of the main body and can be cut according to the width of a movable window glass in a door window, having a glass groove at the lower section for the upper edge of the movable window glass to fit in.

The solar-energy board is provided with two clamps extending foward from the both ends of the front edge for movably catching hold of the holders of the main body or of the ventilating means so that the solar-energy board can be adjusted in its inclination against sunlight to get the most heat, and two conductors abutting the holders to conduct the electricity generated by the solar-energy board to a load.

The ventilating means has a fan, a motor, a base for mounting the fan and the motor, and a housing to shield the fan, the motor and the base. The housing has a cylindrical holder on each of both lengthwise side walls, a conducting ring fitting around the holder and a cap fitting in the interior hollow of the holder to keep the conducting ring in its place. The conducting rings are electrically connected with two conductors fixed at both sides of the base so that electricity can be led through the conductors of the conducting rings to the motor to drive the fan.

BRIEF DESCRIPTION OF THE DRAWINGS

FIG. 2 is an exploded perspective view of the automatic solar-powered car ventilator in the present invention.

FIG. 2-A-A is a cross-sectional view of the auxiliary body in the present invention.

FIG. 3 is an exploded perspective view of the main body in the present invention.

FIG. 4 is a rear side view of the ventilating means in the present invention.

FIG. 5 is a side cross-sectional view of the automatic solar-energy car ventilator in the present invention.

FIG. 6 is an esploded perspective view of the ventilating means in the present invention.

FIG. 7-1 is a front view of this ventilator installed in a car.

FIG. 7-2 is a rear view of this ventilator installed in a car.

DETAILED DESCRIPTION OF THE INVENTION

Figure 1:
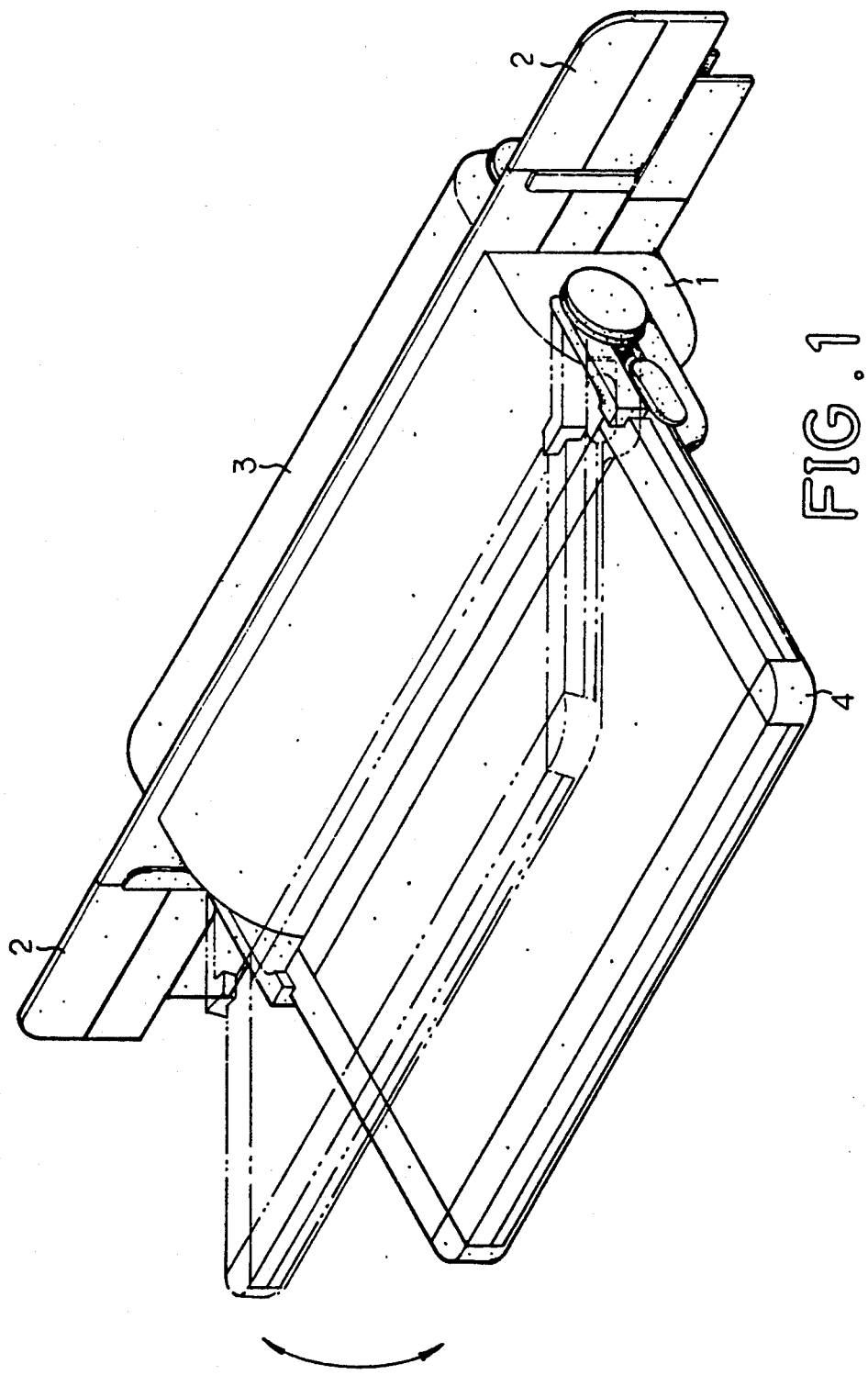
FIG. 1 is a perspective view of the automatic solar-powered car ventilator in the present invention.

The automatic solar-powered car ventilator in the present invention, as shown in FIG. 1, comprises a main body 1, two auxiliary bodies 2, a ventilating means 3 and a solar-energy board 4 as the main components.

The main body 1 is provided with a lengthwise air outlet 11 along the rear section, a long glass groove 12 at the bottom edge for the upper edge of a movable window glass in a window of a car door to fit in, a vertical rectangular plate to be pinched between the upper edge of the movable window and the bottom horizontal edge of the upper bar of the window sash, an auxiliary plate 14 extending from each of both the right and the left side of the vertical plate 13 and having some holes 141 for projections 23 on the auxiliary body 2 to fit in uniting the main body 1 with the auxiliary body 2, and a cylindrical holder 15 separately at both the right and left side vertical end. A conducting ring 151 is provided to fit around the cylindrical holder 15 and has a projecting conductor 152 with a bended end to contact with an L-shaped conductor 154 fixed on the inside surface of the side wall of the main body 1, forming a conducting passage for electricity. Then a cap 155 is provided with a tubular body and a groove 1551 in the tubular body to fit with a fastening projection 153 on the inside wall surface of the holder 15 when the cap 155 is inserted through the conducting ring 151 and in the holder 15 and thus the cap 155 and the conducting ring 151 may not revolve or fall off. In addition, the right side and the left side vertical end of the main body are bored with several holes 1561 below the holders 15, and the L-shaped conductors 154 are bored with through holes 1541 so that a projection group 156 can fit through those holes 1561, 1541 to fix the L-shaped conductor 154 on the inside surface of the side vertical wall of the main body 1 and to let the bended end of the conductor 154 to extend out of the rear surface of the main body 1, as shown in FIG. 2.

The two auxiliary bodies 2 are to be connected with both the right and the left side of the main body 1, having several projections 23 to fit in the holes 141 in the extending plates 14, a horizontal glass groove 22 at the lower edge for the upper edge of a movable window glass in a window of a car door to fit in, and a supplementary plate 221 extending downward from the outside edge of the glass groove 22. The auxiliary bodies 2 are preferably made of extremely hard but brittle material such as ABS (acrylonitrile butadiene styrene) so that it can easily be cut to suit the size of the movable window glass by a user.

Figures 2, 7:
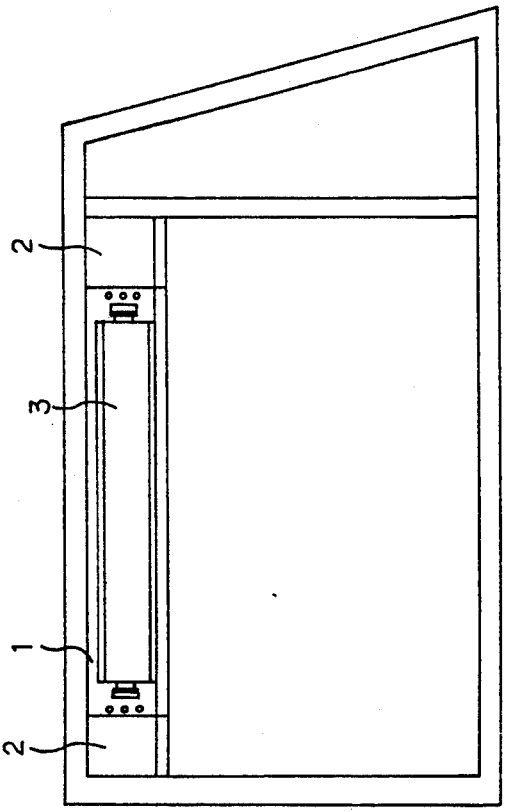
Figures 1, 7:
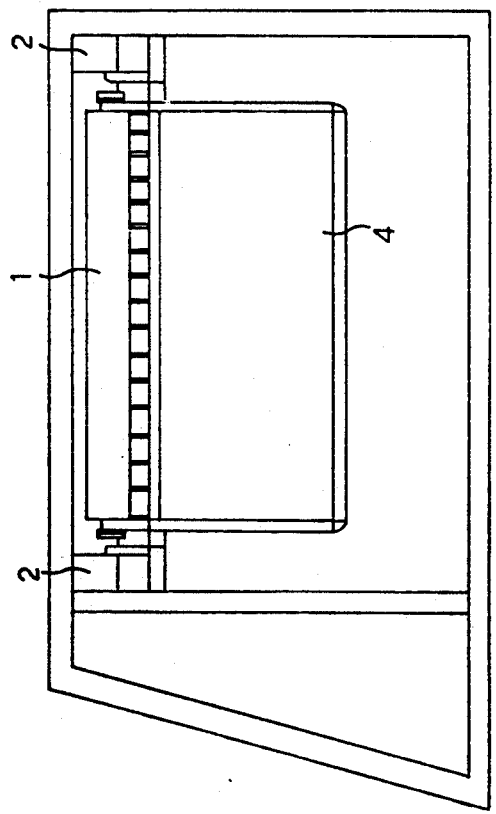

The ventilating means 3, as shown in FIGS. 2, 4 and 6 comprises a fan 31, a motor 32, a base 33 for mounting the fan 31 and the motor 32, and a housing 34 to shield the fan 31, the motor 32 and the base 33. The base 33 has projections 331 to fit in grooves 341 in the housing 34 for assembling or disassembling the housing 34 and the base 33 with help of screws 35, as shown in FIG. 2. Both bottom ends of the base 33 have a notch 332, and above the notch 332 is provided a conductor 36 on the vertical wall.

A cylindrical holder 342 is respectively fixed on the vertical wall of both ends of the housing 34, and a conducting ring 343 fits around holder 342, having a projecting sidewise conductor 345 to rest on a fastening projection 344. A cap 346 inserts through the conducting ring 343 and fits in the interior hollow of the holder 342, and provided with a groove 3461 to fit with the fastening projection 344 to keep the conducting ring 343 and the cap 346 from loosening to fall off.

The projecting conductor 345 is indirectly connected with the conductor 36 on the base 33 by a wire 347 and thus the potential of the conducting ring 343 is the same as that of the conductor 36.

A socket 37 is provided on the base 33 near the motor 32, connected in parallel with the motor 32 and the two conductors 36 at both sides of the base 33 so that the motor 32 can be powered to run when electricity is led in through the socket 137, the conductors 36 or the conducting rings 343. In order to facilitate a plug to insert in the socket 37, the cap 346 has a central through hole 3462 for the plug to pass through. Next, the solar-energy board 4 is provided with a C-shaped clamp 41 projecting from both side ends of the front edge for catching hold of the the cylindrical holders 15 on the main body 1 or the cylindrical holders 342 on the ventilating means 3. The clamp 41 has a roughened inside surface and the holders also has roughened outside surface such that the solar-energy board can be kept stabilized in any inclined angle and thus be adjusted to the best angle to get sunlight. In addition, a projection group 42 is provided to insert in holes in a conductor 43 fixed under the clamp 41 and one end of the conductor 43 has a round contact point 431. The conductors 43 are connected with the two different poles of the solar-energy board 4, which has on its proper point a socket 44 connectd in parallel with the conductors 43 so as to lead the electricity generated by the solar-energy board 4 to a load either through the clamps 41 or the socket 44.

Now, how to operate and manipulate this ventilator is to be described.

Figure 8:
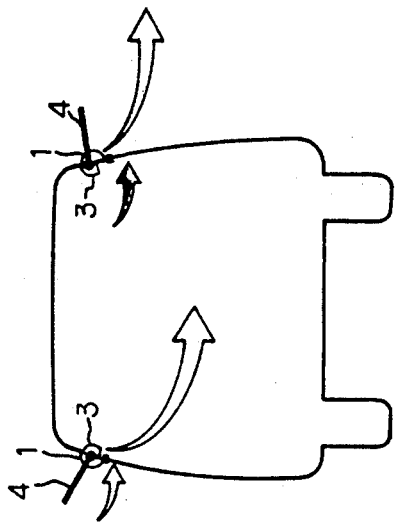
FIG. 8 is a diagram of the air flowing direction available by the ventilator in the present invention.

1. Referring to FIGS. 7, 8, at first, the auxiliary bodies 2 are cut to suit the width of the movable glass in a window of a car door and then be assembled with the main body 1. After that this ventilator is positioned between the upper horizontal bar of the window sash and the upper horizontal edge of the movable window glass, which is moved to hold the ventilator securely. One or both side windows in the car doors can be installed with this ventilator, and if two of them are installed, the two fans can preferably be rotated in different directions.

2. The next step is to install the solar-energy board 4 either on the main body 1 or the ventilating means 3. Then electricity can be sent through the conductor 43, the conducting rings 151, the L-shaped conductors 154, the conductors 36 and to the motor 32. Or electricity can be sent through the conductors 43, the conducting rings 343, the conductors 36 and to the motor 32. But the solar-energy board 4 can also be placed somewhere in a car, not on the main body 1 or the ventilating means 3, then a cord has to be used to connect the solar-energy board 4 with the socket in the ventilating means 3.

3. This ventilator can be changed to suck in or exhaust out air by reversing the polarity of the ventilating means 3. It can be effected by reversing the location of the air inlet and the air outlet, turning them for 180, and then making the notch 332 in the ventilating means 3 inserted in the L-shaped conductors 154. It is quite simple and easy.

4. While in using this ventilator, a user can readily adjust the inclination of the solar-energy board to suit the shining angle of the sun.

5. The solar-energy board can also serve as a sunlight shielder.

6. The ventilating means can also serve as a fan in a car.

7. The electricity generated by the solar-energy board can be used to light a cigarette.

What is claimed is:

1. An automatic solar-powered car ventilator comprising:
a main body being positioned between the upper horizontal bar of a window sash and the upper horizontal edge of the movable glass in a window in a car door, having (1) an air outlet at its front lower section. (2) a glass groove at its rear bottom edge for the upper horizontal edge of a movable glass in a window in a car door to fit in, (3) a rectangular plate at its rear upper section, (4) a wing plate extending from both side ends of the rectangular plate and having several holes, (5) a cylindrical holder fixed respectively at both vertical sides of the main body, (6) a conducting ring being fitted around the cylindrical holder and having a projecting sidewise conductor resting on a fastening projection on the inside surface of the cylindrical holder, (7) an L-shaped conductor being fixed on the inside surface of the side wall where the cylindrical holder is fixed on by means of a projection group and holes, having its bended section protruding out the rear surface of the main body and serving as an electrical conducting line together with the conducting ring, and (8) a fastening cap having a groove in its body to be fitted in by the fastening projection of the cylindrical holder such that when the fastening cap is fitted through the conducting ring and in the interior hollow in the cylindrical holder, the fastening cap and the conducting ring may not loosen to fall off;

one or two auxiliary bodies being connected with one or both sides of the main body, and having (1) a rectangular plate, (2) a glass groove at the bottom edge of the plate, (3) a supplementary plate extending down from the glass groove, (4) one or two projection groups at one or both sides of the supplementary plate for connecting the auxiliary body bodies with the wing plate(s) of the main body;

ventilating means to be mounted on the L-shaped conductor in the main body having (1) a fan, (2) a motor, (3) a base for mounting the fan and the motor and (4) a housing to shield the fan, the motor and the base, said base having projection at both lengthwise sides to fit in grooves at both lengthwise side bottoms of the housing for assembling or disassembling the base and the housing with screws, said base having a notch at each of both lengthwise bottom sides and two conductors on the wall near the notches, said housing having a cylindrical holder respectively at both sides, a conducting ring fitting around the holder, said ring having a projecting conductor to rest on a fastening projection in the holder which is fitted in its interior hollow by a fastening cap fixing the conducting ring, said fastening cap having a groove to fit with the fastening projection in the holder so as to hold tightly the conducting ring and the cap on the holder, and a socket being provided on the base near the motor and connected in parallel with the motor and the conductors or the conducting rings for electricity to be led to the motor;

a solar-energy board having (1) a C-shaped clamp respectively extending forward from the both ends of the front edge to catch hold of the holders of the main body or of the ventilating means, (2) a conductor abutting the clamp having a contact point at one end and connected with one pole of the solar-energy board so as to transmit the electricity generated by the solar-energy board to the motor through the conductors, the contact points, and the conducting rings in the main body or in the ventilating means, and a socket at proper place connected with the conductors;

characteristics that more than two main bodies can be installed in windows with movable glass in the right and left car doors, and one or two ventilating means can be mounted on the main bodies to suck in the open air by one of them and to exhaust out the air in the car by the other so that the hot stale air in the car can be quickly and effectively exhausted out without causing air convection in the car.

2. The automatic solar-powered car ventilator as claimed in claim 1, wherein the C-shaped clamps of the solar-energy board can movably catch hold of the cylindrical holders of the main body or the ventilating means so that the solar-energy board can be adjusted in its inclination against the sunlight to aquire the best result.

3. The automatic solar-powered car ventilator as claimed in claim 1, wherein the caps in the ventilating means have a central hole for a plug to pass through to fit in the socket.

* * * * *